(12) United States Patent
Minato et al.

(10) Patent No.: US 7,333,737 B2
(45) Date of Patent: Feb. 19, 2008

(54) OPTICAL RECEIVER

(75) Inventors: Naoki Minato, Tokyo (JP); Satoko Kutsuzawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 495 days.

(21) Appl. No.: 10/866,698

(22) Filed: Jun. 15, 2004

(65) Prior Publication Data
US 2004/0253002 A1 Dec. 16, 2004

(30) Foreign Application Priority Data
Jun. 16, 2003 (JP) .............................. 2003-170478

(51) Int. Cl.
*H04B 10/06* (2006.01)
(52) U.S. Cl. .......................... 398/202; 398/77; 398/78; 398/79; 398/45; 398/213
(58) Field of Classification Search ............ 398/51–54, 398/75–78, 175, 177, 202; 375/328–373; 455/502
See application file for complete search history.

(56) References Cited

U.S. PATENT DOCUMENTS

| 4,117,405 | A | * | 9/1978 | Martinez ..................... 455/502 |
| 4,527,277 | A | * | 7/1985 | Kosaka et al. ............... 375/328 |
| 5,293,260 | A | * | 3/1994 | Kikawa et al. ............... 398/177 |
| 5,329,559 | A | * | 7/1994 | Wong et al. ................. 375/373 |
| 5,361,154 | A | * | 11/1994 | Nakata ......................... 398/75 |

(Continued)

FOREIGN PATENT DOCUMENTS

JP 11-38371 2/1999
JP 2000-209186 7/2000

OTHER PUBLICATIONS

Wada et al: "Error-Free 100km Transmission at 10Gbit/s in Optical Code Division Multiplexing System Using BPSK Picosecond-Pulse Code Sequence with Novel Time-Gating Detection", Electronics Letters, May 13, 1999, vol. 35 No. 10, p. 833-834.*
Ken-ichi Kitayama, Hideyuki Sotobayashi, and Naoya Wada, "Optical Code Division Multiplexing (OCDM) and Its Applications to Photonic Networks". IEICE Trans. Fundamentals, vol. E82-A, No. 12, pp. 2616-2625, Dec. 1999.

*Primary Examiner*—Kenneth Vanderpuye
*Assistant Examiner*—Li Liu
(74) *Attorney, Agent, or Firm*—Rabin & Berdo, PC

(57) ABSTRACT

There is provided an optical receiver in which a time gate can be realized with a simple, low-cost configuration, and which has few aspects that require adjustment. The optical receiver of the present invention comprises a decoding circuit in which optical signals which are spread over time in accordance with a coding pattern are inputted and decoded in accordance with a decoding pattern; and a time gate circuit for generating a time gate signal that represents the interval of time in which a significant optical pulse is present in the decoded optical signal, and controlling the passage of the decoded optical signal. The time gate circuit comprises optical splitting means for splitting the decoded optical signal from the decoding circuit into two, optical/electric conversion means for converting one of the split optical signals into an electric signal, time gate signal generation means for generating a time gate signal whose frequency is the fundamental frequency component in synchronism with the electric signal, and gate means for controlling the passage of the other split decoded optical signal in accordance with the time gate signal.

7 Claims, 10 Drawing Sheets

U.S. PATENT DOCUMENTS 6,178,213 B1 * 1/2001 McCormack et al. ....... 375/355
6,650,845 B1 * 11/2003 Kurita et al. ............... 398/175
7,177,544 B1 * 2/2007 Wada et al. .................. 398/51
2002/0126784 A1 * 9/2002 Brazeau et al. ............. 375/371

* cited by examiner

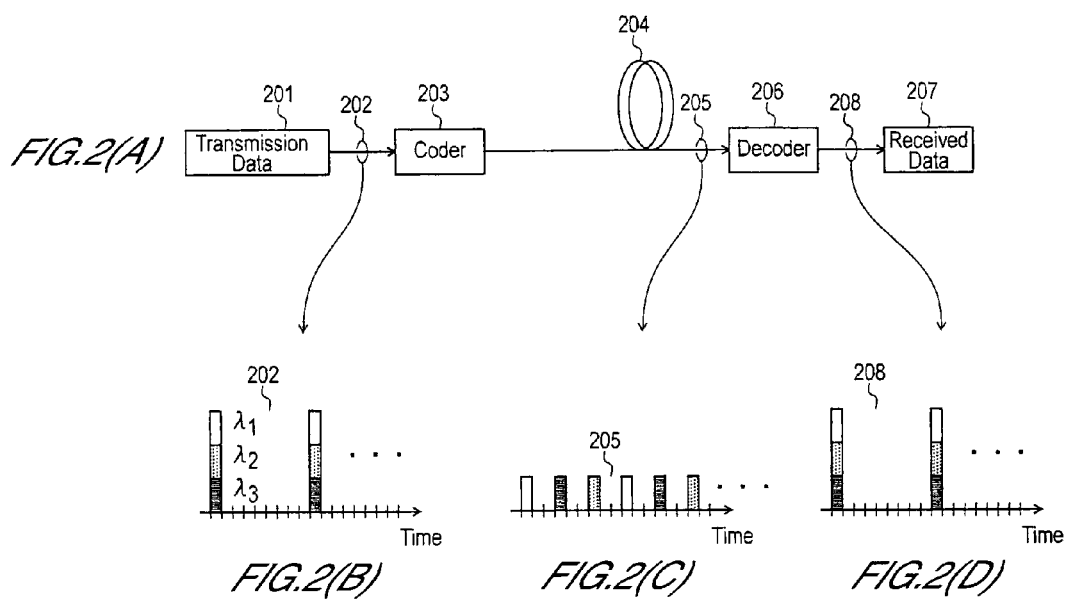

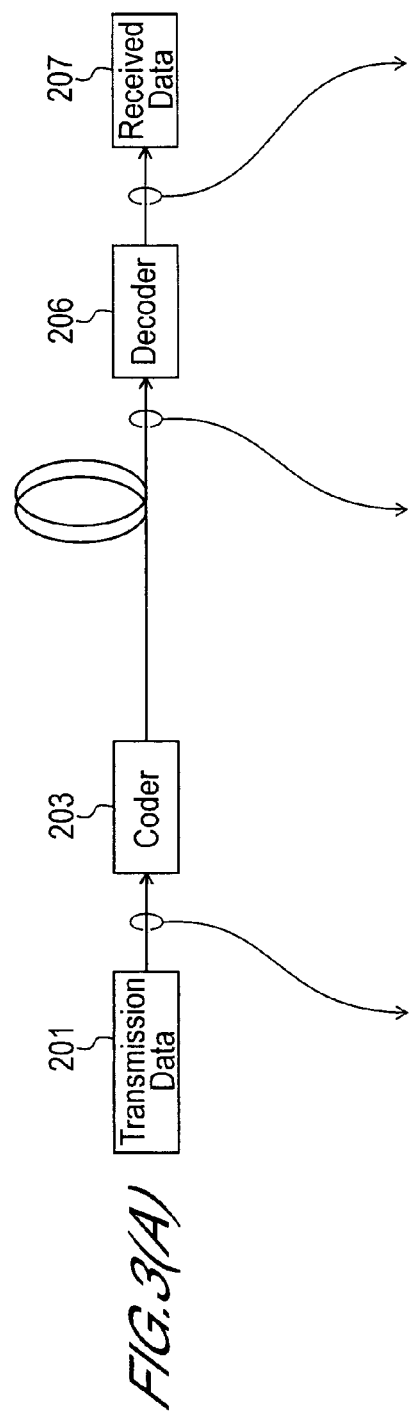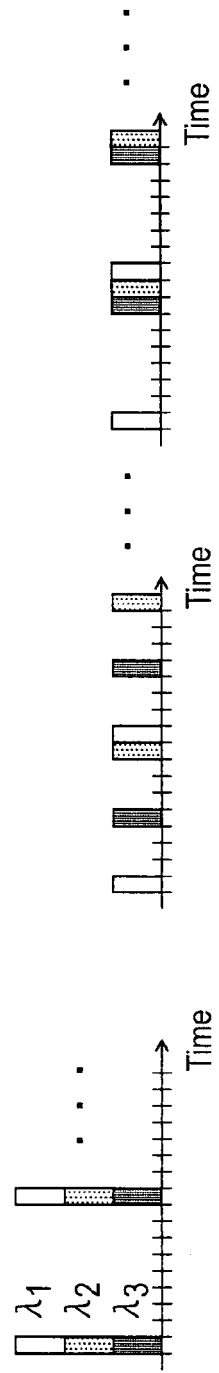

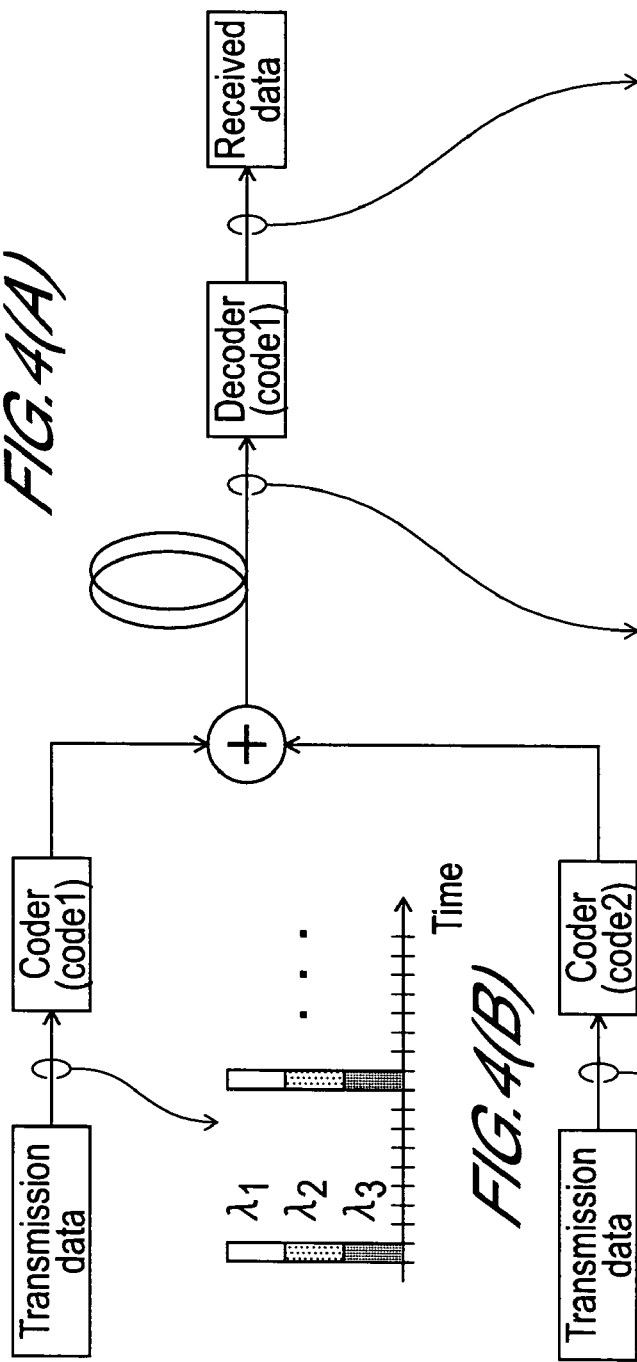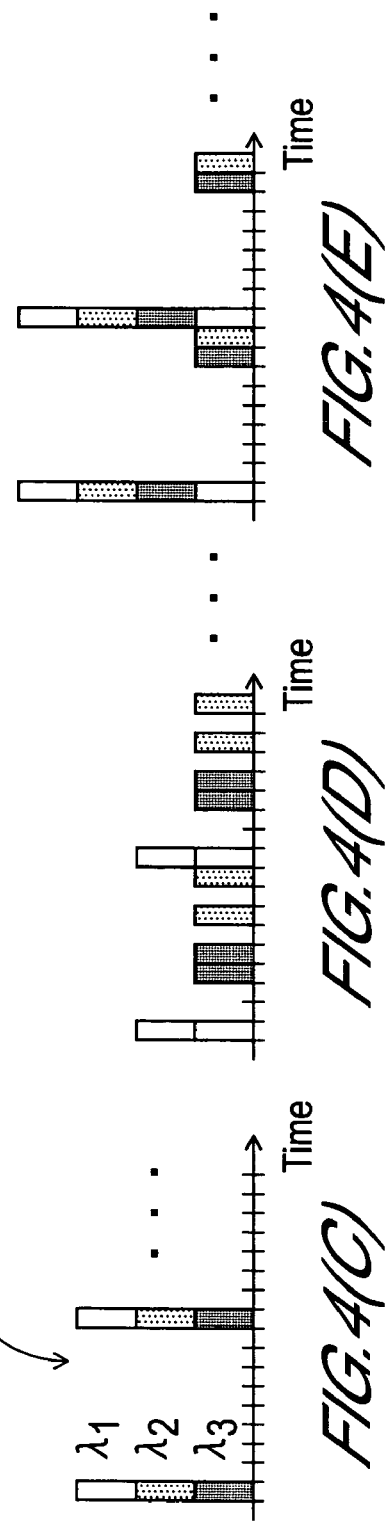

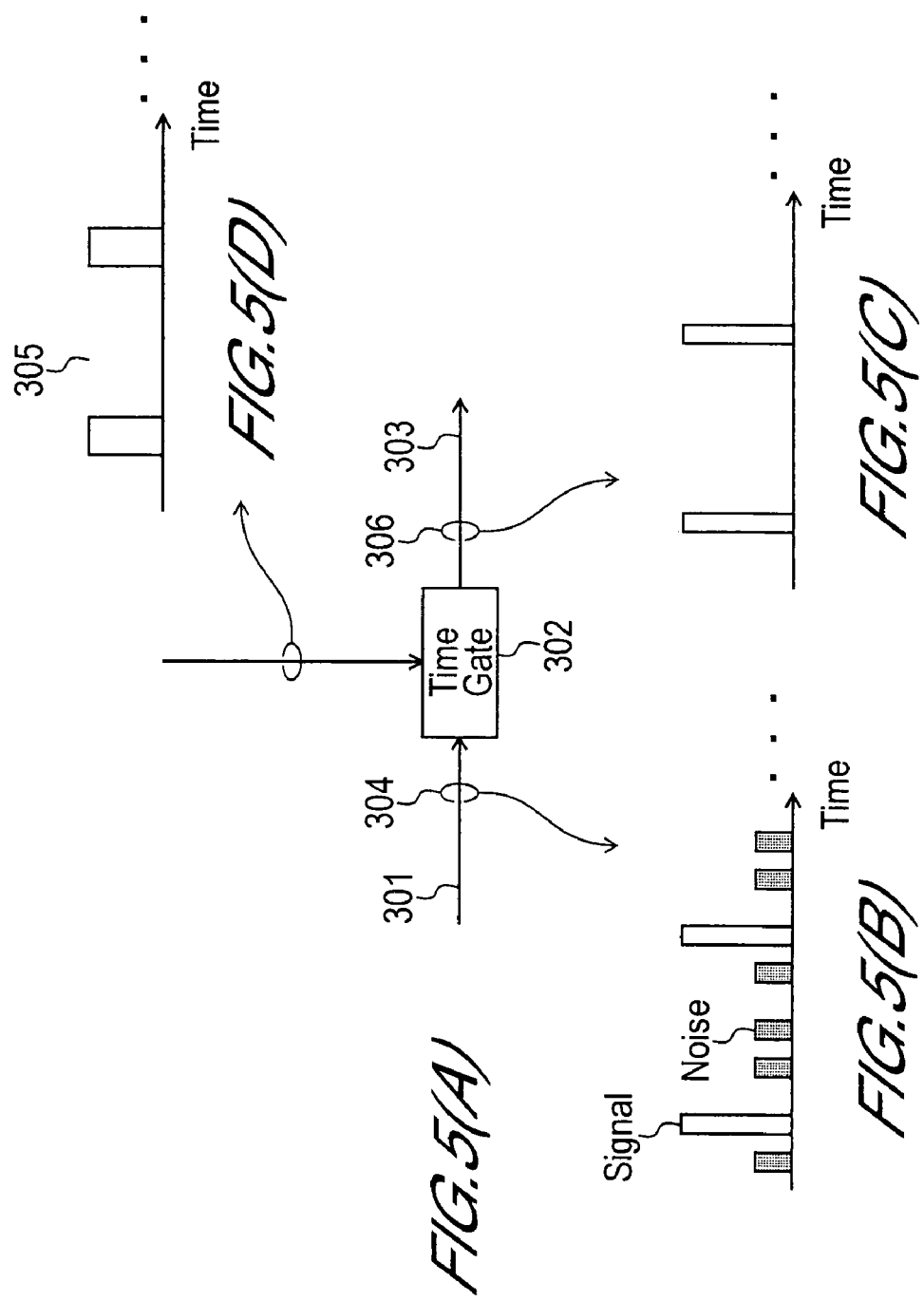

INF

20ps/div

20ps/div

OPTICAL RECEIVER

BACKGROUND OF THE INVENTION

1. Field of the Invention

The present invention relates to an optical receiver, and more particularly to an optical receiver that can be applied to waveform shaping for decoded light in optical code division multiplexing (OCDM), for example.

2. Description of Related Art

In recent years, OCDM is receiving attention as a multiplexing method suitable for increasing the speed and capacity of optical metro access networks. OCDM is a method that realizes multiplexing by coding/decoding channels with the aid of optical orthogonal codes in an optical receiver. Examples of coding/decoding methods include direct spreading methods, time spreading methods, wavelength hopping methods, and time spreading/wavelength hopping methods.

First, the coding and decoding steps in the time spreading/wavelength hopping method cited in Japanese Patent Application Laid-open No. 2000-209186 is described with reference to FIGS. 2(A) to 4(E). In order to show a signal propagated in a transmission line, the diagrams of the pulse signal that are depicted with respect to the time axis at positions indicated by the arrows drawn out from the circles in FIGS. 2(A), 3(A), and 4(A), with the circles drawn around the transmission line in the figures, are expressed as charts that show the time axis waveform of the signal propagated in the transmission line.

Transmission data 201, which is an optical signal, is fed to a coder 203 on the transmission side, as shown in FIG. 2(A). The transmission data 201 (202), which is an optical signal, is data in which light composed of wavelengths $\lambda 1$ to $\lambda 3$ with a predetermined number of wavelengths (three wavelengths in FIGS. 2(A) to 4(D)) is modulated for intensity in a return-to-zero (RZ) format in accordance with the transmission data, which is an electric signal, and valid data is generated in a time slot (chip) for each data cycle, as shown in FIG. 2(B). The wavelength components contained in the transmission data 201 are delayed (coded) in the coder 203 by a specific interval of time in accordance with a specific coding pattern (Code 1), resulting in an optical signal 205 that has a waveform spread out along the time axis, as shown in FIG. 2(C).

Thus, the optical signal 205 obtained by time spreading with a delay time that corresponds to the wavelength components arrives at the decoder 206 by way of the transmission line 204.

In the decoder 206, the wavelength components in the inputted optical signal 205 are delayed (decoded) by a specific interval of time in accordance with the specific coding pattern (Code 1) and de-spread along the time axis (the differences in delay time of the wavelength components are offset), as shown in FIG. 2(D), the wavelength components are superimposed in the same chip period, and received data 207 (208) that is the same as the initial transmission data 201 (202) is obtained. The waveform of the received data 207 (208) obtained when the coding patterns of such coders 203 and decoders 206 match each other is referred to as an autocorrelation waveform.

A case in which the coding patterns in the coder-203 and the decoder 206 differ from each other is shown in FIGS. 3(A) to 3(D). In other words, in this case the coder 203 has a coding pattern (Code 2), and the decoder 206 has a decoding pattern (Code 1).

When different codes are used in the coder 203 and the decoder 206, as shown in FIGS. 3(A) to 3(D), the time delay difference is not offset by the processing in the decoder 206, and the waveform (received data) has a low peak and is spread out in the direction of the time axis, as shown in FIG. 3(D). The waveform of the received data obtained when the coding patterns of the coder and decoder are different in this manner is referred to as a cross-correlation waveform.

A case in which a coded optical signal is multiplexed is described with reference to FIGS. 4(A) to 4(E). FIG. 4(A) is a diagram that shows a case in which signals respectively coded in two different coders (Code 1) and (Code 2) are merged, propagated through a transmission line, and decoded in a decoder (Code 1). The transmission data respectively coded in the coders (Code 1) and (Code 2) have optical pulse waveforms on the time axis shown in FIGS. 4(B) and 4(C). In the optical pulses, light signals with the wavelengths $\lambda 1$ to $\lambda 3$ are interspersed and overlain on the time axis, as shown in FIGS. 4(B) and 4(C). Pieces of transmission data respectively coded in the coders (Code 1) and (Code 2) are merged, propagated in the transmission line, fed to the decoder (Code 1), and decoded at that point. The time waveform of the optical pulse signal propagating through the transmission line has the shape shown in FIG. 4(D). The time waveform of the received data (decoded signal) that is outputted by the decoder has the shape shown in FIG. 4(E), signifying that received data is obtained as a sum of the autocorrelation waveform and the cross-correlation waveform.

The sum of the autocorrelation waveform and the cross-correlation waveform in the received data (decoded signal) is obtained in the same manner as with any coding/decoding method other than a time spreading/wavelength hopping method. The cross-correlation waveform becomes noise with respect to the desired signal, thereby causing the signal-to-noise ratio (SN ratio) during data identification to degrade.

Consequently, a method whereby a time gate is applied during the optical signal stage to eliminate cross-correlation waveforms has already been proposed as a method for improving the SN ratio. (Refer to a publication, for example, K. Kitayama, et al., "Optical Code Division Multiplexing (OCDM) and Its Applications to Photonic Networks," IEICE Trans. Fundamentals, Vol. E82-A, No. 12, pp. 2616-2625, December 1999).

Elimination of cross-correlation waveforms with the aid of a time gate is briefly described with reference to FIGS. 5(A) to 5(D). In order to show a signal propagated in a transmission line, the diagrams of the pulse signal that are depicted with respect to the time axis at positions indicated by the arrows drawn out from the circles in FIG. 5(A), with the circles drawn around the transmission line in the figures, are expressed as charts that show the time axis waveform of the signal propagated in the transmission line. The time waveform 304 represented by the sum of the autocorrelation waveform (desired signal) indicated by the white rectangles and the cross-correlation waveform (noise) indicated by the shaded rectangles, as shown in FIG. 5(B), is the optical signal 301 after decoding. In the time gate 302, the time waveform is processed by the time gate signal 305 shown in FIG. 5(D) such that the signal is allowed to pass (gate on) at the same time as the peak of the autocorrelation wave, and the gate is blocked (gate off) at other times. At this time, an optical signal 306 with noise removed is obtained because only the desired signal passes through the time gate 302.

In the above-noted publication (Kitayama), a decoded optical signal is split into two, an optical clock is extracted from one of the split optical signals with the aid of a mode-locking laser, the state of polarization of the optical clock and the other decoded optical signal are controlled, and four-wave mixing is then generated in a semiconductor amplifier to realize a time gate. After having passed through the time gate, the optical signal has unneeded wavelength components due to the four-wave mixing, so the desired signal alone is extracted by means of a wavelength filter.

When eliminating noise with the above-described time gate, the peak of the autocorrelation wave and the gate-on timing must be matched to allow passage through the gate. Consequently, the timing of the received signal must be extracted in the receiver in an actual OCDM system. However, the timing of the desired signal must be extracted from a coded multiplexed signal in which the noise level is changing. Furthermore, the signal is transmitted through optical fiber that is affected by temperature fluctuations and other environmental factors, so the timing of the signal pulse string differs on the transmission and receiving sides, and is constantly changing with time. The timing must be extracted under such, conditions.

The method disclosed in the above-described publication (Kitayama) is suitable for increasing speed because it is a method that uses a time gate based on optical signal processing.

However, a large number of optical elements are required to realize a time gate, and the system is made more expensive as a result. Also, the polarization state of the optical clock and the decoded optical signal are fixed in a desired shape, so adjustments must be made with a polarization state control device in addition to many aspects that require adjustment, and adjustment work is complicated.

A need therefore exists for an optical receiver which has a simple, low-cost configuration, in which a time gate can be realized, and which has few aspects that require adjustment.

SUMMARY OF THE INVENTION

In order to solve the above-described problems, it is a purpose of the present invention is to provide an optical receiver to which an optical signal spread over time in accordance with a coding pattern on the transmission side is inputted, comprising (1) a decoding circuit for decoding the inputted optical signal in accordance with a decoding pattern that corresponds to the coding pattern, (2) a time gate circuit for generating, based on a decoded optical signal outputted by the decoding circuit, a time gate signal that represents the interval of time in which a significant optical pulse is present in the decoded optical signal, and passing or blocking the decoded optical signal, and (3) a data regeneration circuit for regenerating data from the decoded optical signal that is outputted via the time gate circuit. Also, the time gate circuit (2) has (2-1) optical splitting means for splitting the decoded optical signal outputted by the decoding circuit into two, (2-2) optical/electric conversion means for converting one of the split optical signals into an electric signal, (2-3) time gate signal generation means for generating, in synchronism with the converted electric signal, a time gate signal whose frequency is the fundamental frequency component thereof, and (2-4) gate means for passing or blocking the other split decoded optical signal in accordance with the generated time gate signal.

BRIEF DESCRIPTION OF THE DRAWINGS

The foregoing and other objects, features and advantages of the present invention will be better understood from the following description taken in connection with the accompanying drawings, in which:

FIGS. 2(A) to 2(D) are diagrams describing the coding and decoding steps in the time spreading/wavelength hopping method (when an autocorrelation waveform can be obtained);

FIGS. 3(A) to 3(D) are diagrams describing the coding and decoding steps in the time spreading/wavelength hopping method (when a cross-correlation waveform can be obtained);

FIGS. 4(A) to 4(E) are diagrams describing a case in which signals respectively coded in two different coders (Code 1) and (Code 2) are merged, propagated through a transmission line, and decoded in a decoder (Code 1) (when received data can be obtained as a sum of an autocorrelation waveform and a cross-correlation waveform);

FIGS. 5(A) to 5(D) are diagrams describing the elimination of cross-correlation waveforms with the aid of a time gate, and the basic principles thereof;

DESCRIPTION OF THE PREFERRED EMBODIMENTS

First Embodiment

Figure 1:
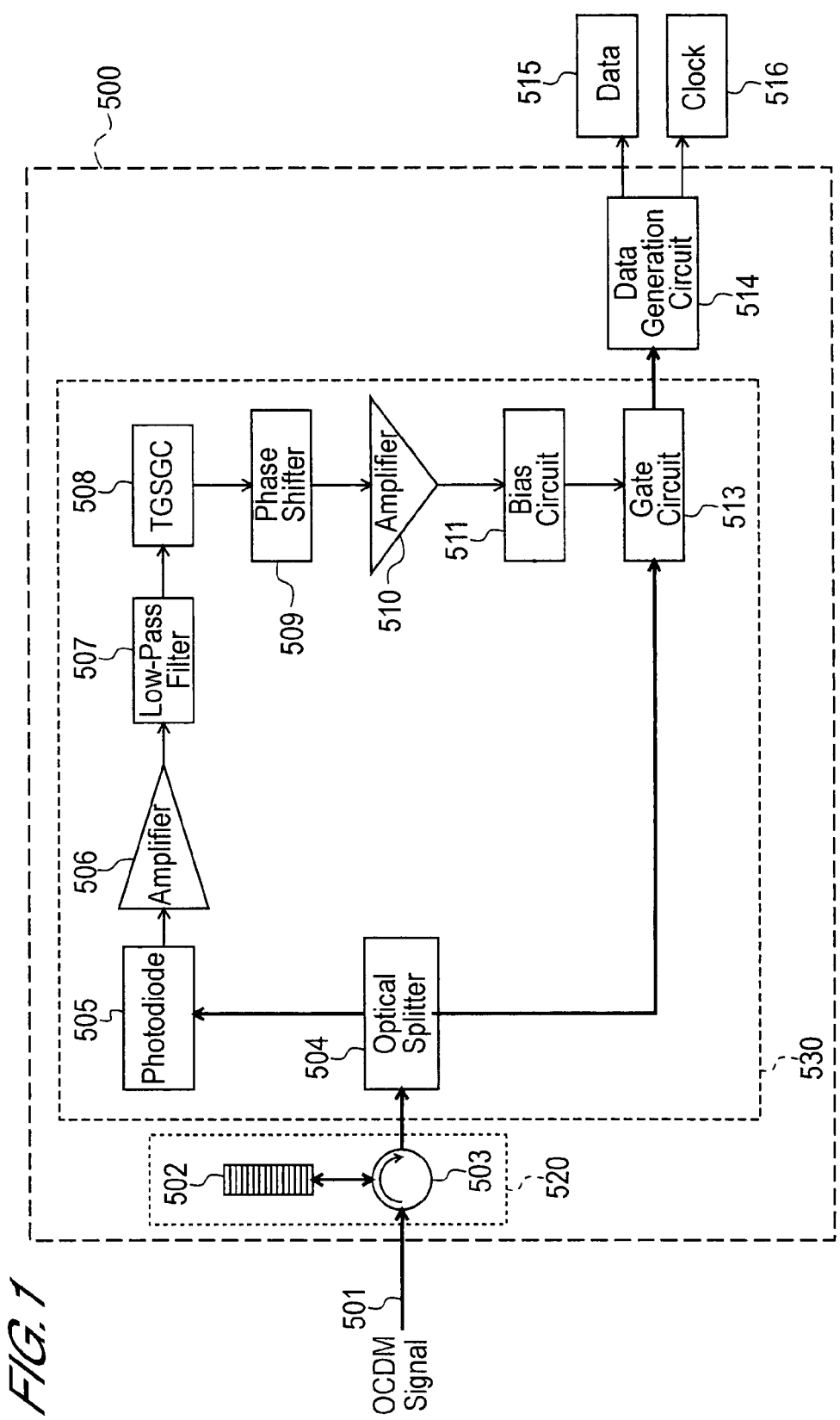
FIG. 1 is a block diagram showing the configuration of the first embodiment.

The first embodiment of the optical receiver of the present invention is described in detail below with reference to the drawings. In the drawings, optical signal paths are indicated by thick lines, and electrical signal paths are indicated by thin lines. Numbers assigned to these thick and thin lines, in addition to denoting the paths themselves, also denote the optical signals or electrical signals which are propagated in the respective paths.

FIG. 1 is a block diagram showing the entire configuration of the optical receiver 500 of the first embodiment.

The optical receiver 500 of the first embodiment comprises a decoding circuit 520, a time gate circuit 530, and a data regeneration circuit 514.

The decoding circuit 520 comprises a circulator 503 and a fiber Bragg grating (FBG) 502. The decoding circuit 520 is provided as a decoding circuit for an OCDM signal 501 (refer to FIG. 4(D)) transmitted by way of a transmission line (optical fiber, for example).

The inputted OCDM signal 501 is fed to the fiber Bragg grating 502 by way of the circulator 503. The fiber Bragg grating 502 has a different reflecting position for each wavelength component contained in the OCDM signal 501, and the reflecting positions correspond to the decoding pattern (coding pattern) of the channel assigned to the optical receiver 500. In other words, the optical signal emitted by the fiber Bragg grating 502 is a decoded optical signal (refer to FIG. 4(E)), which is the sum of autocorrelation waveform (the desired signal) and the cross-correlation waveform (noise). This decoded optical signal is fed to the time gate circuit 530 by way of the circulator 503.

The time gate circuit 530 comprises an optical splitter 504, a photodiode 505, an amplifier 506, a low-pass filter (LPF) 507, a time gate signal generation circuit 508, a phase shifter 509, an amplifier 510, a bias circuit 511, and a gate circuit 513.

The optical splitter 504 splits a decoded optical signal into two and feeds one split decoded optical signal to the gate circuit 513, and the other split decoded optical signal to the photodiode 505.

The photodiode 505 converts a decoded optical signal to an electric signal, which is fed to the amplifier 506.

The amplifier 506 and low-pass filter (comprising a Bessel filter, for example) 507 perform transmission processing whereby the decoded signal converted to an electric signal is amplified and the unnecessary components are filtered out, and feed the result to the time gate signal generation circuit 508.

The time gate signal generation circuit 508 comprises, for example, a PLL (Phase Lock Loop) circuit and presents to the phase shifter 509 a time gate signal which is synchronous with the inputted coded signal and whose frequency is the fundamental frequency component (inverse of the code period) thereof.

The phase shifter 509 essentially performs phase processing in order to compensate for processing delay in the time gate signal generation processing system. The phase shifter 509 comprises, for example, a manual variable delay device that allows adjustments to be made to eliminate product variability in the processing delay in the time gate signal generation processing system.

The amplifier 510 and the bias circuit 511 are provided as a driver for the gate circuit 513. The amplifier 510 amplifies the generated time gate signal, and the bias circuit 511 converts the direct current level of the time gate signal after amplification to an externally provided bias level, which is fed to the gate circuit 513. The bias level not only ensures that the gate circuit 513 is driven, but also contributes to setting the width of the time gate signal ON interval (gate width).

Functionally, the gate circuit 513 is an electrically controllable optical switch for which an electroabsorption (EA) modulator, for example, can be used. The gate circuit 513 passes the decoded optical signal from the optical splitter 504 during the interval of time in which the time gate signal is ON, and blocks the optical signal during the interval of time in which the time gate signal is OFF. The optical signal outputted from the gate circuit 513 is one in which the cross-correlation waveform (noise) is removed from the decoded optical signal.

The optical signal outputted by the gate circuit 513 is fed to the data regeneration circuit 514. In the case of the first embodiment, a detailed configuration of the data regeneration circuit 514 is not depicted because the data regeneration circuit has no special characteristics. The data regeneration circuit 514 converts an optical signal outputted, for example, by the gate circuit 513 into an electric signal; regenerates the clock 516 with the aid of a PLL circuit or the like, compares the signal converted to an electric signal with the threshold value in synchronism with the clock, and regenerates the data 515.

According to the above-described first embodiment, noise components can be removed from the decoded optical signal with a simple configuration in which electric elements are assigned multiple uses.

Figure 6A:
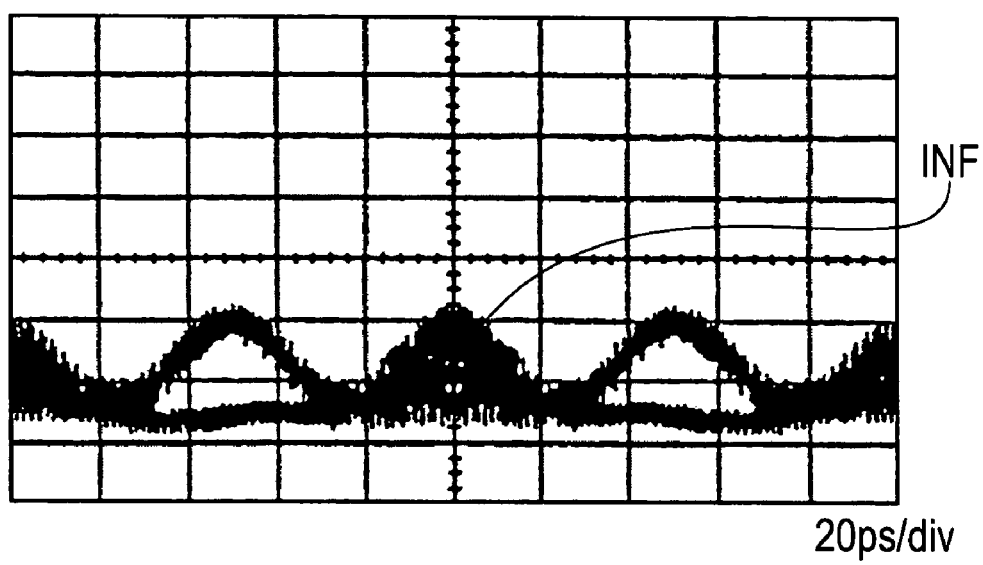
FIGS. 6(A) and 6(B) are diagrams showing the eye pattern of an input optical waveform and the eye pattern of the output optical waveform of a gate circuit.

FIGS. 6(A) and (B) respectively show the eye pattern of an optical waveform input to the gate circuit 513, and the eye pattern of an optical waveform outputted therefrom, and are the results of performing an experiment in accordance with the experimentation conditions (system specifications used in the experiment) shown in TABLE 1.

TABLE 1

| item | value | unit | note |
|---|---|---|---|
| number of multiplexed channels | 2 | | |
| bit rate | 9.95328 | Gbit/s | |
| period of sequence | 400 | ps | |
| code sequence | Prime-hop series | | time spreading/wavelength hopping methods (number of time chips = 25, number of wavelengths = 5) |
| central wavelength of signal pulses | 1552 | nm | |
| channel spacing | 0.8 | nm | |

Figure 6B:
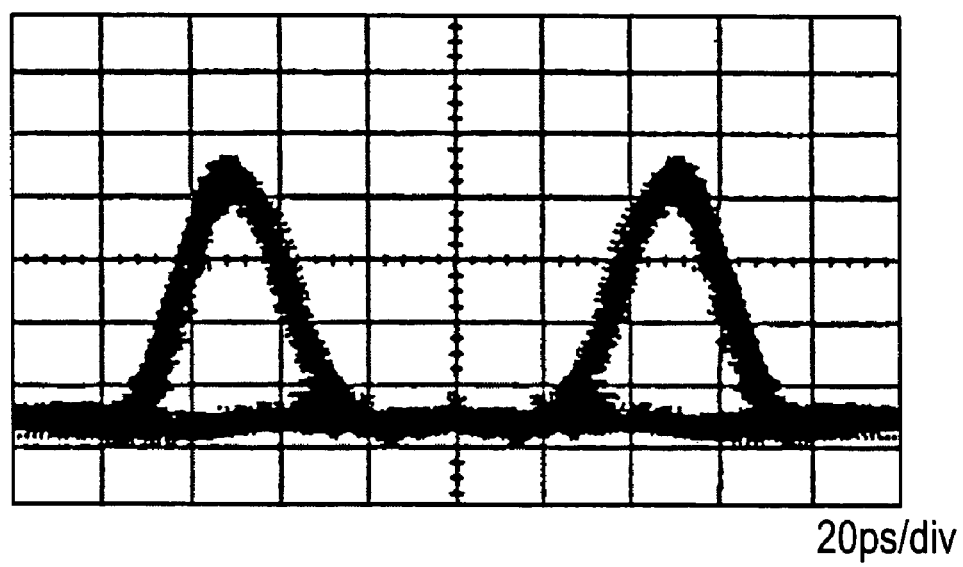

A noise component INF from another channel is contained in the signal prior to passing through the gate circuit 513, as shown in FIG. 6(A), but the noise component INF is removed when the signal travels through the gate circuit 513, as shown in FIG. 6(B). In other words, in accordance with the first embodiment, the noise component is adequately removed when the speed is about 10 Gbit/s and the data is double multiplexed.

Figure 7:
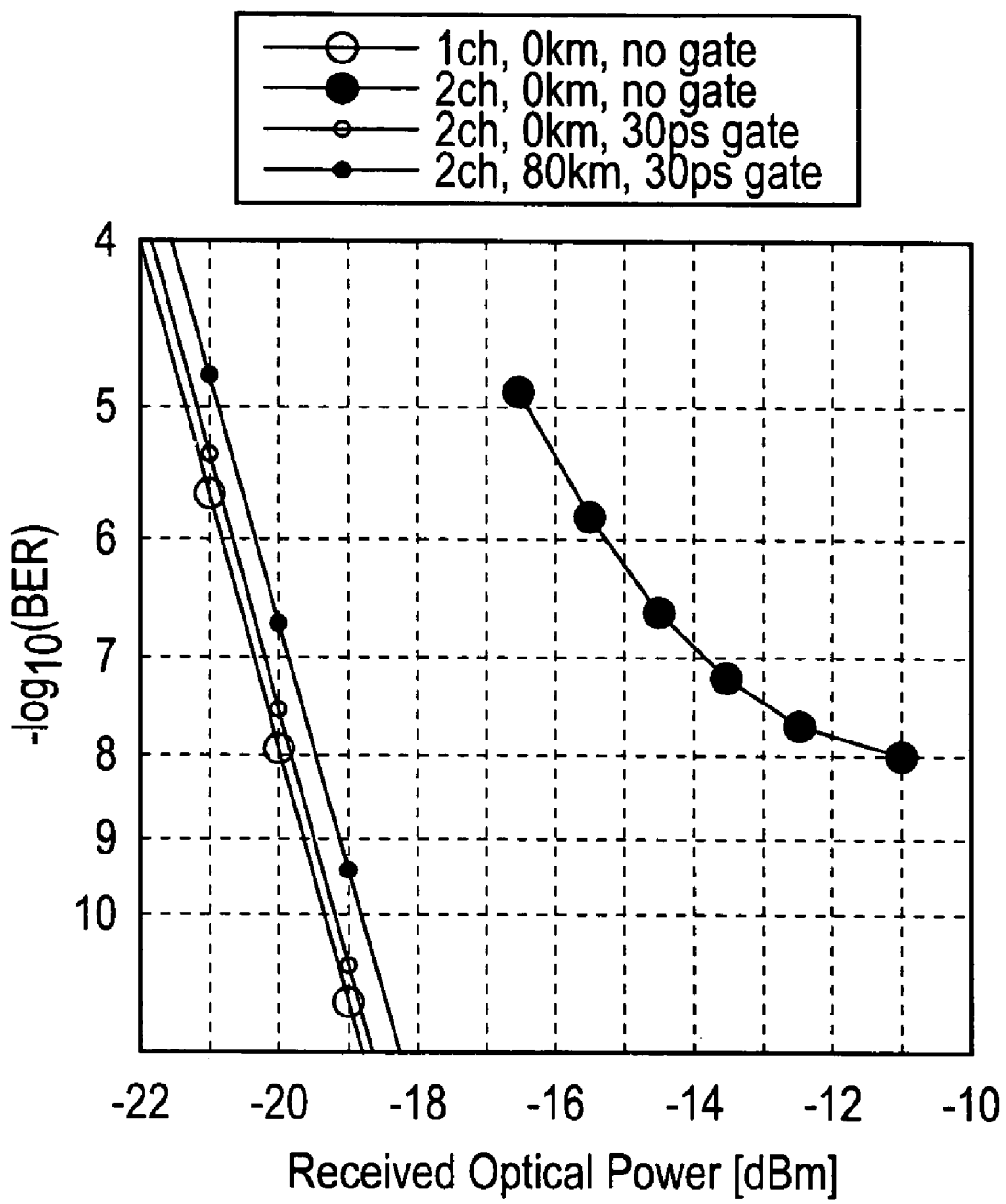
FIG. 7 is a diagram showing the measurement result of the bit error rate (BER) of reproduced data.

FIG. 7 shows the measurement results of the bit error rate (BER) in the regeneration data 515; the vertical axis is used to plot the bit rate error on the common logarithmic scale in $-\log_{10}$ (BER) values; and the horizontal axis is used to plot, in dBm, optical power received in the data regeneration circuit 514. In FIG. 7, the small black dots and small white dots are the experimental results of applying a time gate (time gate width: 30 ps) in accordance with the first embodiment, and the experiment conditions (system specifications used in the experiment) are shown in TABLE 1. The small white dots represent the measurement results of the bit error rate when the optical transmitter and the optical receiver (optical receiver of the first embodiment) are directly coupled. The small black dots represent the measurement results of the bite error rate when the optical transmitter and the optical receiver (optical receiver of the first embodiment) are connected by way of 80 km of dispersion-shifted optical fiber (DSF). The straight lines connecting the small black dots and the small white dots are both found further to the left-hand side of FIG. 7 than the curved line connecting the large black dots. It is apparent from this fact that the bit error rate can be considerably improved in comparison with a case in which a time gate represented by a large black dot is not used (the optical transmitter and the optical receiver are directly coupled).

For reference, the large white dots represent the measurement results of the bit error rate when the signal is not multiplexed. It is apparent that a bit error rate that is substantially the same as when the signal is not multiplexed can be achieved by time gate processing in accordance with the first embodiment when the level of multiplexing is two, because the straight line connecting the large white dots and the straight lines connecting the small black dots and the large white dots are in substantially the same position. In other words, the drawbacks of multiplexing can be reduced through the use of the time gate in the first embodiment.

Also, based on FIG. 7, reception error characteristics can be improved in the following manner through the use of a time gate. In other words, in the case that the bit error rate is $10^{-8}$ (the position labeled "8" on the vertical axis), the improvement is about 7.5 dB, and in the case that the bit error rate is $10^{-5}$ (the position labeled "5" on the vertical axis), the improvement is 5.0 dB. Furthermore, it is apparent that the error floor can be eliminated through the use of a time gate because the curved line connecting the small white dots is substantially a straight line. It is also apparent that a bit error rate of $10^{-10}$ or less can be achieved through the use of a time gate because the measuring point at which the bit error rate is $10^{-10}$ or less is found on the curved line connecting the small white dots.

Furthermore, because the gap between the straight line connecting the large white dots and the straight line connecting the small white dots in the direction of the horizontal axis is 1 dB or less, the power drawback of the signal to which a time gate is applied is 1 dB or less, and it is apparent that the variability of the receiving timing after transmission through optical fiber is offset even after an 80-km transmission through a dispersion-shifted optical fiber (DSF).

Second Embodiment

Next, the second embodiment of the optical receiver of the present invention is described in detail with reference to the diagrams.

Figure 8:
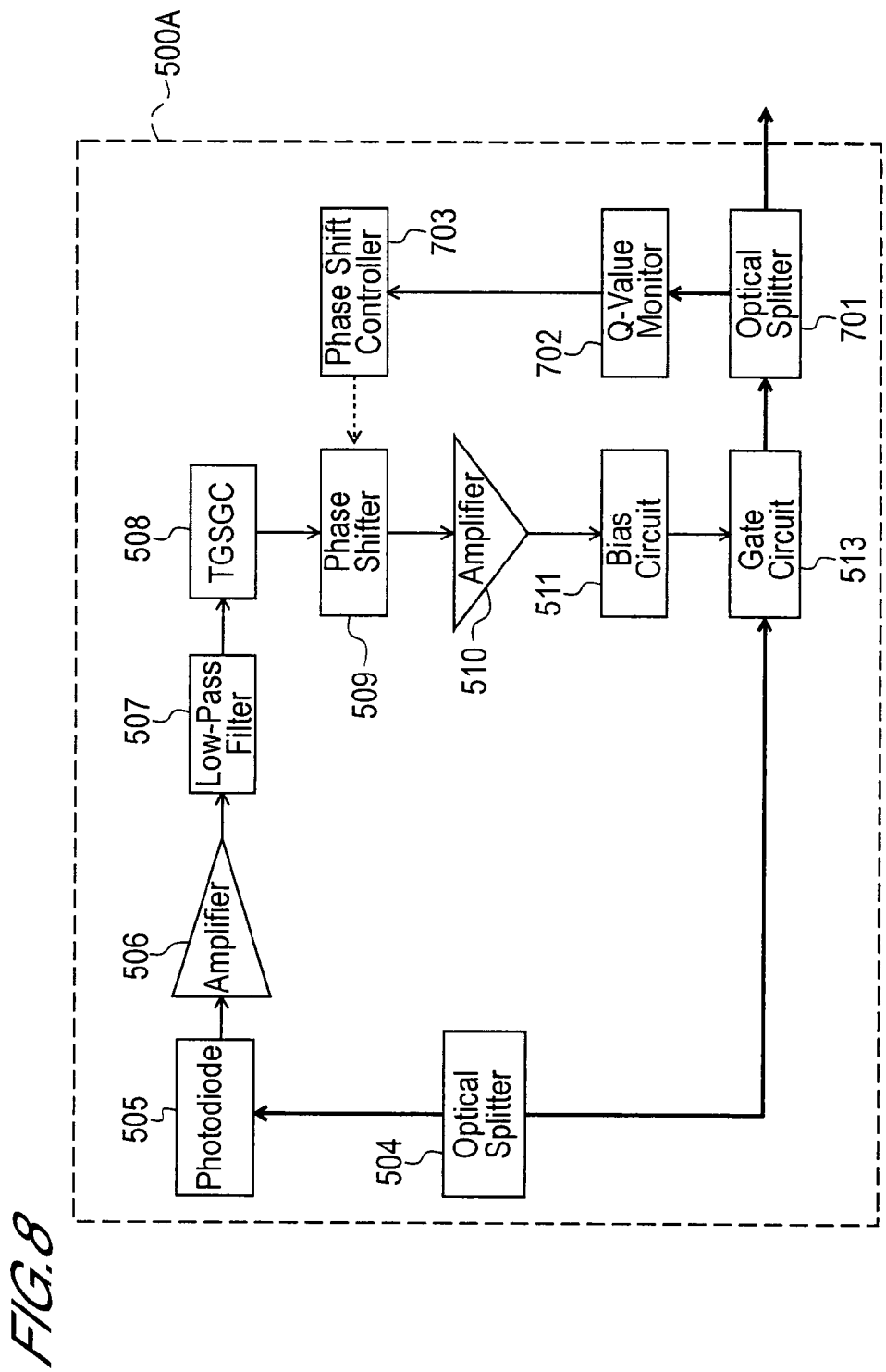
FIG. 8 is a block diagram showing a detailed configuration of a time gate circuit in the optical receiver of the second embodiment.

FIG. 8 is a block diagram showing a detailed configuration of a time gate circuit in the optical receiver 500A of the second embodiment, and a depiction of the decoding circuit and the data regeneration circuit is omitted. In FIG. 8, the same symbols are assigned to portions (constituent elements) that correspond to FIG. 1, which describes the first embodiment.

In addition to the configuration of the first embodiment, the time gate circuit of the second embodiment comprises an optical splitter 701, a Q-value monitor 702, and a phase shift controller 703, as is apparent from the a comparison of FIGS. 1 and 8.

The optical splitter 701 splits the optical signal outputted by the gate circuit 513 into two, one split optical signal is fed to the data regeneration circuit, which is not depicted (refer to FIG. 1), and the other split optical signal is fed to the Q-value monitor 702.

The Q-value monitor 702 is provided for the purpose of monitoring the parametric value in which the timing between the time gate signal and the decoded optical signal fed to the gate circuit 513 is evaluated. The Q-value monitor 702 is a device for monitoring the Q-value represented by Eq. (1) (a new Q-value is calculated for each clock input), with a time gate signal outputted by the time gate signal regeneration circuit 508 being used as a clock. For example, a commercial-grade device may be used in unaltered form.

$$Q = \{s(1)-s(0)\}/\{\sigma(1)+\sigma(0)\} \quad (1)$$

Here, s(1) and s(0) are average values of the levels (optical intensities) in which the data is "1" or "0," respectively; and $\sigma(1)$ and $\sigma(0)$ are standard deviations of the levels (optical intensities) in which the data is "1" or "0," respectively. In other words, the larger (the more suitable) the difference is between the average level in which the data is a "1" and the average level in which the data is a "0," the higher the Q-value is. Also, the smaller (the more suitable) the level fluctuation in which the data is a "1" or the level fluctuation in which the data is a "0" is, the higher the Q-value is.

In other words, the larger the Q-value is, the better the timing is between the time gate signal and the decoded optical signal fed to the gate circuit 513, and if the timing is poor, then the Q-value is smaller.

The phase shift controller 703 feeds a control signal to the phase shifter 509 on the basis of the Q-value provided by the Q-value monitor 702 to control the phase of the time gate signal outputted by the time gate signal generation circuit 508. The phase shift controller 703 determines, for example, the phase shift of the time gate signal at the start of communication, upon detecting loss of synchronization, or the like, and fixes the phase shift at the maximum Q-value. In other words, the phase shift control process comprises a phase shift sweep process and a maximum Q-value detection process.

The phase shift sweep process is carried out first, and in this process the phase shift of the phase shifter 509 is continuously varied until the Q-value detected by the Q-value monitor 702 reaches a certain threshold value. The threshold value at this point is determined by the designer on the basis of the system specifications. For example, the value Q=6 may be set. This value is one in which the bit error rate of the received data signal corresponds to $10^{-9}$ in a communication conducted under the experimentation conditions (system specifications used in the experiment) shown in TABLE 1. Reception is deemed to be impossible when the phase shift exceeds 360° but Q=6 is not yet attained. When this is not the case, the system switches to the maximum Q-value detection process at the point where Q=6. The changed portion of the Q-value attributable to phase change is detected in this process. When the Q-value is degrading, the phase shift is excessively large, so the phase is returned to the previous phase position and fixed at that phase position. When the Q-value is improving, the maximum Q-value has not been attained, so the phase is shifted further and the maximum Q-value detection process is repeated.

The same effects as in the first embodiment can also be achieved by the second embodiment. Furthermore, a feedback loop is provided to the timing for the time gate signal, so the timing of the time gate signal and the decoded optical signal fed to the gate circuit 513 can be made equivalent to or better than the first embodiment, and, as a result, an improved bit error rate can be expected.

The second embodiment is particularly effective in systems in which optical receivers for decoding different codes coexist, systems in which the layout of the optical fiber (length of the optical fiber) to optical receivers varies, and other systems in which different types of optical receivers are present. In other words, even if the timing of the time gate signal and the decoded optical signal is different for each optical receiver, the optical receivers can be optimized with the automatic adjustment function. In a system such as that described above, the amount or duration of work would be considerable if the adjustments were to be performed manually.

Third Embodiment

Next, the third embodiment of the optical receiver of the present invention is briefly described with reference to the diagrams.

Figure 9:
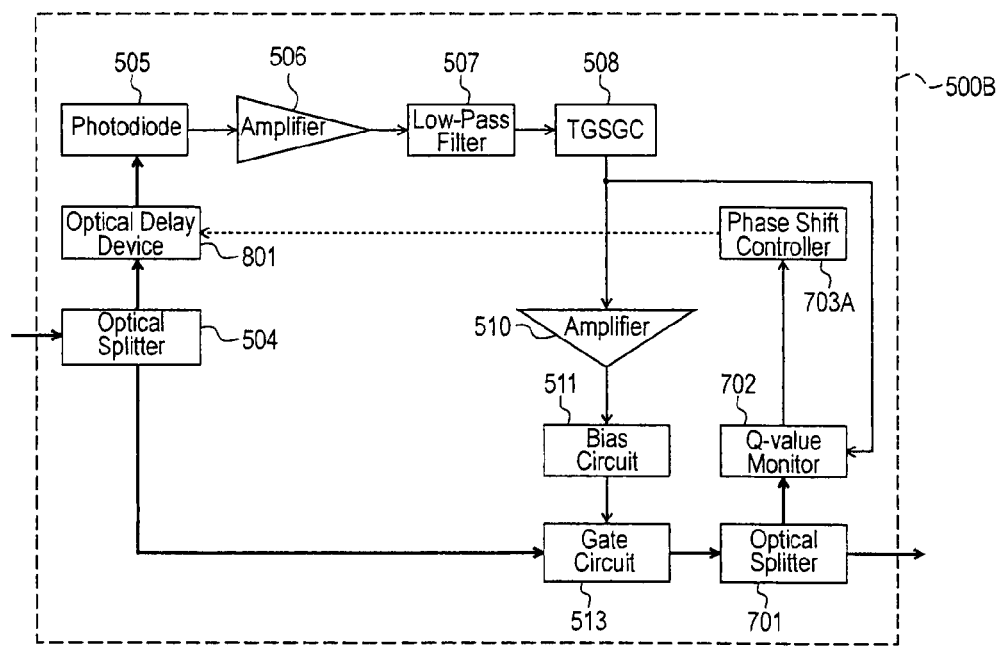
FIG. 9 is a block diagram showing a detailed configuration of a time gate circuit in the optical receiver of the third embodiment.

FIG. 9 is a block diagram showing a detailed configuration of a time gate circuit in the optical receiver 500B of the third embodiment, and a depiction of the decoding circuit and the data regeneration circuit is omitted. In FIG. 9, the same symbols are assigned to portions (constituent elements) that correspond to FIG. 8, which describes the second embodiment.

In the time gate circuit in the optical receiver 500B of the third embodiment, the phase shifter 509 is omitted and an optical delay device 801 for varying the delay time by means of a control signal from a delay controller 703A is disposed instead in the optical path of the optical splitter 504 and photodiode 505.

In other words, the optical receiver 500B of the third embodiment is configured so that the timing of the time gate signal fed to the gate circuit 513 can be adjusted by means of the optical delay device 801.

The same effects as in the second embodiment can also be achieved by the third embodiment.

Other Embodiments

The configuration of the decoding circuit is not limited to the one shown in the first embodiment. The specific configuration of the data regeneration circuit 514 may also be arbitrary.

The phase shift of the phase shifter 509 was controlled in the second embodiment, and the amount of delay in the optical delay device 801 was controlled in the third embodiment to adjust the timing of the time gate signal fed to the gate circuit 513, but it is possible to adjust the timing with other methods.

Figure 10:
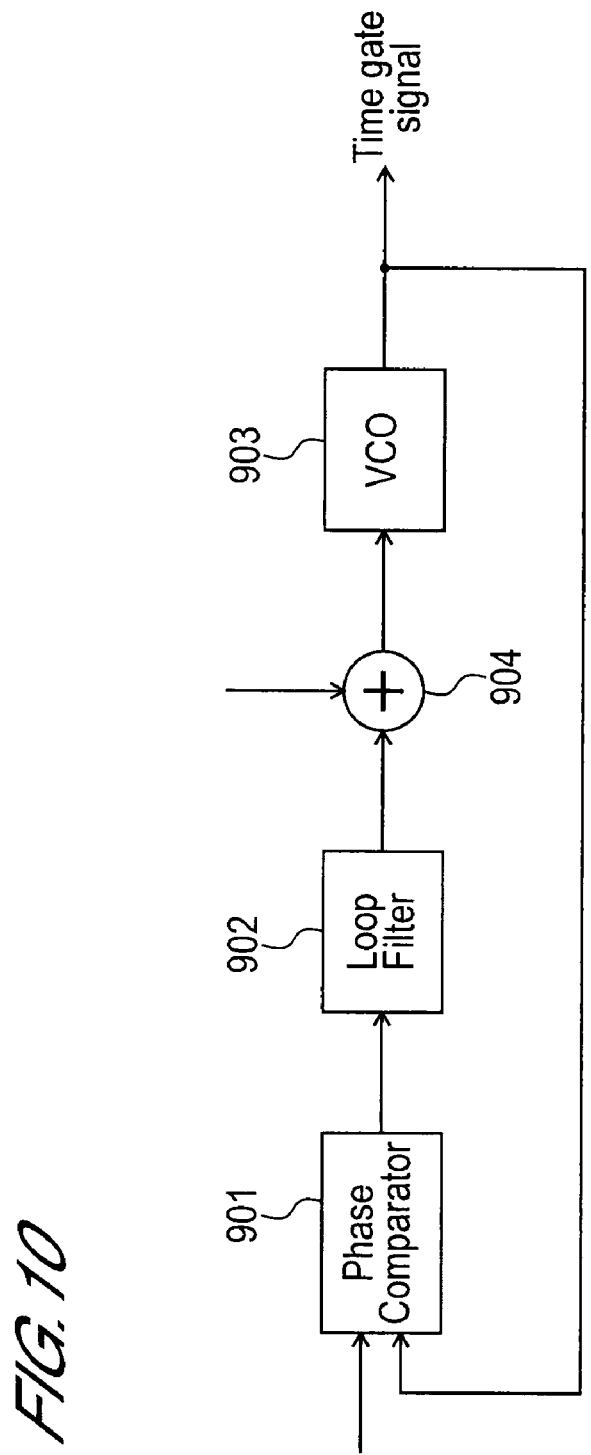
FIG. 10 is a block diagram showing the essential components of an embodiment when the time gate signal generation circuit comprises a PLL circuit.

FIG. 10 is a schematic block diagram showing the essential components of a PLL circuit, applicable to the second embodiment. The PLL circuit comprises a phase comparator 901, a loop filter 902, an adder 904, and a voltage-controlled oscillator (VCO) 903. In the case that, for example, the time gate signal generation circuit 508 is configured with a PLL circuit such as that shown in FIG. 10, a configuration may be adopted whereby the adder 904 for adding the control signal constituting the direct current level to the output signal of the loop filter 902 is disposed between the loop-filter 902 and the VCO 903, and the timing of the output signal itself from the time gate signal generation circuit 508 is caused to vary.

In each of the above-described embodiments, the timing of the time gate signal fed to the gate circuit 513 was adjusted, but the timing of the decoded optical signal fed to the gate circuit 513 may be adjusted instead. In the above-described third embodiment, the optical delay device 801 disposed between the optical splitter 504 and the photodiode 505 may also be disposed between the optical splitter 504 and the gate circuit 513, for example.

In the second and third embodiments, a Q-value was used as a parameter for evaluating the timing of the time gate signal fed to the gate circuit 513, but another evaluation parameter may be used. Simple optical intensity (power) may be used as the parameter for adjusting the timing, for example.

The technological ideas of the present invention are suitable for an optical receiver for receiving multiplexed optical signals, but these may also be applied to optical receivers for receiving solely a single optical signal (optical signal corresponding to a single channel) that is temporally coded and spread over time.

As described above, a time gate with a simple, low-cost configuration can be realized in accordance with the present invention, and an optical receiver with few aspects that require adjustment can be realized.

What is claimed is:

1. An optical receiver to which an optical code division multiplexed signal spread over time in accordance with a coding pattern on a transmission side is inputted, comprising:

a decoding circuit for decoding the inputted optical signal in accordance with a decoding pattern that corresponds to the coding pattern;

a time gate circuit for generating, based on a decoded optical signal outputted by the decoding circuit, a time gate signal that represents an interval of time in which a significant optical pulse is present in the decoded optical signal, and for passing or blocking the decoded optical so as to output a gated optical signal in response to the time gate signal, said time gate circuit including:

optical splitting means for splitting the decoded optical signal outputted by the decoding circuit into two;

optical/electric conversion means for converting one of the split optical signals into an electric signal;

time gate signal generation means for generating, in synchronism with the converted electric signal, a time gate signal whose frequency is the fundamental frequency component thereof; and gate means for receiving the other split optical signal and the generated time gate signal, and for passing or blocking the other split optical signal in accordance with the time gate signal so as to output the gated optical signal, a data regeneration circuit for regenerating data from the gated optical signal;

timing adjustment means for matching the timing of the other split optical signal and at he time gate signal that are inputted to the gate means; and timing control means for obtaining an evaluation value of a timing relationship between the other split optical signal and the time gate signal on the basis of the gated optical signal, and for controlling the timing adjustment means in accordance with the evaluation value, wherein the evaluation value is a Q value when evaluating an optical signal in which the magnitude of the light intensity corresponds to data "0" or "1."

2. The optical receiver according to claim 1, wherein said timing adjustment means is disposed in the processing path for generating a time gate signal.

3. The optical receiver according to claim 2, wherein said timing adjustment means adjusts the timing in an electric signal stage.

4. The optical receiver according to claim 2, wherein said timing adjustment means adjusts the timing in an optical signal stage.

5. The optical receiver according to claim 1, wherein the Q value increases as the difference between the average light intensity level when the data is "1" and the average light intensity level when the data is "0" increases.

6. The optical receiver according to claim 1, wherein the Q value increases as the average light intensity level when the data is "1" increases or the average light intensity level when the data is "0" decreases.

7. The optical receiver according to claim 1, wherein the Q value is calculated repeatedly as follows:

$$Q = \{s(1) - s(0)\} / \{\sigma(1) + \sigma(0)\}$$

where s(1) and s(0) are average values of received optical intensities when the data is "1" and "0" respectively, and where σ(1) and σ(0) are standard deviations of received optical intensities when the data is "1" and "0" respectively.

* * * * *